US010110735B2

(12) United States Patent
Tian et al.

(10) Patent No.: US 10,110,735 B2
(45) Date of Patent: Oct. 23, 2018

(54) METHOD AND APPARATUS FOR PROMPTING MESSAGE ON BATTERY LEVEL

(71) Applicant: Beijing Xiaomi Mobile Software Co., Ltd., Haidian District, Beijing (CN)

(72) Inventors: Hao Tian, Beijing (CN); Bin Wang, Beijing (CN); Zhaodong Wei, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/643,735

(22) Filed: Jul. 7, 2017

(65) Prior Publication Data

US 2018/0034958 A1   Feb. 1, 2018

(30) Foreign Application Priority Data

Jul. 28, 2016   (CN) .......................... 2016 1 0608762

(51) Int. Cl.
  *H04W 8/24*   (2009.01)
  *H04M 1/725*   (2006.01)
  *H04M 3/42*   (2006.01)

(52) U.S. Cl.
  CPC ... *H04M 3/42093* (2013.01); *H04M 1/72522* (2013.01); *H04W 8/24* (2013.01); *H04M 2203/6054* (2013.01)

(58) Field of Classification Search
  CPC ............. H04W 12/06; H04W 52/0229; H04W 52/0261; H04W 8/26; H04M 3/4365;
  (Continued)

(56) References Cited

U.S. PATENT DOCUMENTS 8,060,080 B2 * 11/2011 Im ..................... H04W 52/0261
                                                     455/425
2013/0029640 A1 * 1/2013 Wong .................. H04L 63/0861
                                                     455/411

(Continued)

FOREIGN PATENT DOCUMENTS

CN    102131011 A    7/2011
CN    102917324 A    2/2013

(Continued)

OTHER PUBLICATIONS

Extended European Search Report in connection with corresponding EP Application No. 17182640, dated Oct. 16, 2017, 8 pages.

(Continued)

*Primary Examiner* — Nizar Sivji
(74) *Attorney, Agent, or Firm* — Arch & Lake LLP

(57) ABSTRACT

Methods and apparatuses are provided for prompting a notification message. The method includes: receiving a calling telephone number and a called telephone number sent by a calling terminal when calling of the called telephone number is failed; obtaining stored battery level information associated with the called telephone number from a battery level information database. The battery level information database stores battery level information uploaded by a terminal corresponding to a telephone number when a battery level of the terminal is lower than a first preset value. When the obtained battery level information indicates a preset low battery level state, the device sends a notification message to the calling telephone number, where the notification message indicating that a called terminal corresponding to the called telephone number has been shut down due to a low battery level.

12 Claims, 8 Drawing Sheets

(58) Field of Classification Search
CPC .... H04M 3/493; H04M 3/42; H04M 3/42017; H04M 3/42042; H04M 3/436; H04M 3/42008; H04M 3/42059; H04M 3/42102; H04M 3/5233; H04M 1/72522; H04M 2203/6054; H04L 65/1069; H04L 3/42
See application file for complete search history.

(56) References Cited

U.S. PATENT DOCUMENTS

2014/0237123 A1 8/2014 Dave et al.
2016/0029316 A1* 1/2016 Mohan .............. H04W 52/0229
455/417

FOREIGN PATENT DOCUMENTS

WO 2006066631 A1 6/2006
WO 2009156570 A1 12/2009

OTHER PUBLICATIONS ahinese Office Action issued in corresponding Cn Patent Application No. 201610608762.9, dated Jul. 24, 2018, 20 pp.

* cited by examiner

METHOD AND APPARATUS FOR PROMPTING MESSAGE ON BATTERY LEVEL

CROSS-REFERENCE TO RELATED APPLICATION

The present application is based upon and claims priority to Chinese Patent Application No. 201610608762.9, filed Jul. 28, 2016, the entire contents of which are incorporated herein by reference.

TECHNICAL FIELD

The present disclosure generally relates to the field of communication, and more particularly, to methods and apparatuses for prompting a message on battery level.

BACKGROUND

Making and receiving calls are basic functions of a mobile terminal such as a mobile phone, and are one of common functions of the mobile communication terminal used by a user. The user can chat and communicate with friends, colleagues, family members, and the like through functions of making and receiving calls. However, the mobile phone may shut down itself and thus a call to the mobile phone may be failed.

SUMMARY

Embodiments of the present disclosure provide a prompting method and apparatus. Technical solutions are as follows:

According to a first aspect of the present disclosure, there is provided a prompting method. The method may be implemented by a server. In the method, the server receives a calling telephone number and a called telephone number sent by a calling terminal when calling of the called telephone number is failed. The server obtains stored battery level information associated with the called telephone number from a battery level information database, where the battery level information database stores battery level information uploaded by a terminal corresponding to a telephone number when a battery level of the terminal is lower than a first preset value. When the obtained battery level information indicates a preset low battery level state, the server may send a notification message to the calling telephone number, where the notification message indicates that a terminal corresponding to the called telephone number has been shut down due to a low battery level.

According to a second aspect of the present disclosure, there is provided a prompting method, which may be implemented at least partially in a terminal. The method include at least following acts: obtaining a called telephone number when calling of the called telephone number is failed; sending a calling telephone number and the called telephone number to a server, the server being used to send a notification message indicating that a terminal corresponding to the called telephone number has been shut down due to a low battery level to the calling telephone number when battery level information of the called telephone number obtained from a battery level information database indicates a low battery level state; and receiving and displaying the notification message sent by the server.

According to a third aspect of the present disclosure, there is provided a prompting method. The method may include following acts: obtaining a battery level of a terminal; and if the battery level is lower than a first preset value, sending a telephone number of the terminal and first battery level information indicating that the battery level of the terminal is in a preset low battery level state to a server, the sever being used to associatively store the telephone number of the terminal and the first battery level information in a battery level information database, and send a notification message indicating that the terminal has been shut down due to a low battery level to a calling telephone number when receiving the calling telephone number and the telephone number of the terminal sent by a calling terminal due to failed calling of the telephone number of the terminal and obtaining the first battery level information from the battery level information database.

According to a fourth aspect of the present disclosure, there is provided a prompting apparatus, which includes: a processor and a non-transitory memory for storing instructions executable by the processor. The processor is configured to: receive a calling telephone number and a called telephone number sent by a calling terminal when calling of the called telephone number is failed; obtain stored battery level information associated with the called telephone number from a battery level information database, where the battery level information database stores battery level information uploaded by a terminal corresponding to a telephone number when a battery level is lower than a first preset value; and when the obtained battery level information indicates a preset low battery level state, send a notification message indicating that a terminal corresponding to the called telephone number has been shut down due to a low battery level to the calling telephone number.

According to a fifth aspect of the present disclosure, there is provided a prompting apparatus. The apparatus includes: a processor and a memory for storing instructions executable by the processor. The processor is configured to: obtain a called telephone number when calling of a called telephone number is failed; send a calling telephone number and the called telephone number to a server, the server being used to send a notification message indicating that a terminal corresponding to the called telephone number has been shut down due to a low battery level to the calling telephone number when battery level information associated with the called telephone number obtained from a battery level information database indicates a low battery level state; and receive and display the notification message sent by the server.

According to a sixth aspect of the present disclosure, a prompting apparatus may include: a processor and a memory for storing instructions executable by the processor. The processor is configured to: obtain a battery level of a terminal; and if the battery level is lower than a first preset value, send a telephone number of the terminal and first battery level information indicating that the battery level of the terminal is in a preset low battery level state to a server, the sever being used to associatively store the telephone number of the terminal and the first battery level information in a battery level information database, and send a notification message indicating that the terminal has been shut down due to a low battery level to a calling telephone number when receiving the calling telephone number and the telephone number of the terminal sent by a calling terminal due to failed calling of the telephone number of the terminal and obtaining the first battery level information from the battery level information database.

According to a seventh aspect of the present disclosure, there is provided a non-transitory readable storage medium including instructions, executable by a processor in a device. The instructions cause the process to perform acts including: receiving a calling telephone number and a called telephone number sent by a calling terminal when calling of the called telephone number is failed; obtaining stored battery level information associated with the called telephone number from a battery level information database, battery level information uploaded by a terminal corresponding to a telephone number when a battery level is lower than a first preset value being stored in the battery level information database; and when the obtained battery level information indicates a preset low battery level state, sending a notification message indicating that a terminal corresponding to the called telephone number has been shut down due to a low battery level to the calling telephone number.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Technical solutions provided by embodiments of the present disclosure relate to a terminal device that is capable of making calls and a server.

Figure 1:
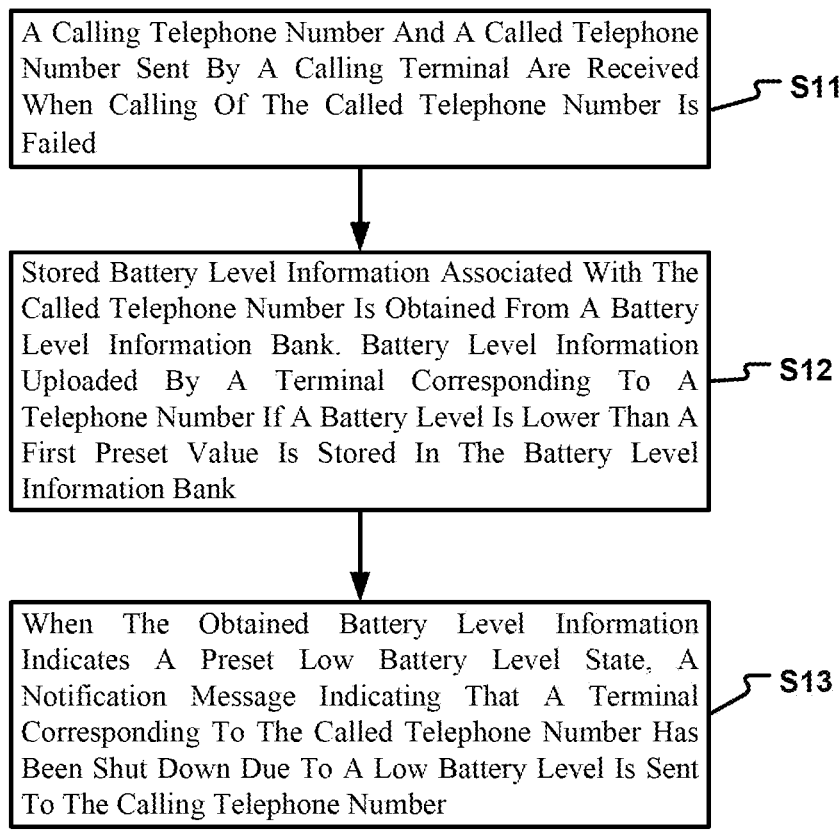
FIG. 1 is a flowchart showing a prompting method according to one or more exemplary embodiments.

FIG. 1 is a flowchart showing a prompting method according to one or more exemplary embodiments. As shown in FIG. 1, the prompting method may be at least partially implemented in a server, and includes the following steps S11 to S13.

In step S11, a calling telephone number and a called telephone number sent by a calling terminal are received when calling of the called telephone number is failed. For example, the calling terminal may receive a message indicating that the call is failed, not answered, etc. The calling terminal may determine that the calling terminal is connected to the cellular network itself when the call to the called telephone is placed.

One of the reasons why calling of the called telephone number by the calling terminal is failed may be that a terminal corresponding to the called telephone number has been shut down due to depleted battery level. Thus, the calling terminal may inquire the server of the called telephone number whether that is the case.

In step S12, stored battery level information associated with the called telephone number is obtained from a battery level information database. Battery level information uploaded by a terminal corresponding to a telephone number when a battery level is lower than a first preset value is stored in the battery level information database. The battery level information database may be accessible to the server and is updated from time to time when the user of the terminal agrees to share that information with one or more other users.

In step S13, when the obtained battery level information indicates a preset low battery level state, a notification message indicating that a terminal corresponding to the called telephone number has been shut down due to a low battery level is sent to the calling telephone number. The user of the called terminal may grants the access about the battery level information to one or more selected users using their corresponding telephone numbers. For example, the user may only grants the spouse and a few close friends the accesses so that the spouse and close friends could be informed when the called terminal is turned off because of depleted memory. The user may grant and revoke the access to anyone using an application on his mobile terminal.

Although the mobile terminal is used as an example here, any electronic devices having a battery and a communication chip may implement at least part of the method so that the user of the electronic device may get others notified when the battery level of the electronic device is below a preset threshold. For instance, for an electric car, the driver may want to notify the server so that others could be notified when the battery level of the electric car is below the preset threshold. The electronic device may also include: a smart watch, a drone, an electronic toy, a GPS receiver, etc.

In the method provided by the present disclosure, the server receives the called telephone number sent by the calling terminal, and obtains stored battery level information associated with the called telephone number from a battery level information database. If the obtained battery level information indicates a low battery level state, it indicates that before calling a terminal corresponding to the called telephone number, battery level of the terminal corresponding to the called telephone number is already lower than a first preset value, and thus calling of the called telephone number by the calling terminal is failed. The reason might be that the terminal corresponding to the called telephone number has been shut down due to a low battery level. At this time, a notification message indicating that the terminal corresponding to the called telephone number has been shut down due to the low battery level is sent to the calling telephone number, which can function to prompt a calling user. Therefore, when a mobile phone of a called party cannot be connected, the calling user can be timely informed that the mobile phone of the called party has been shut down due to depleted battery level, and thus unnecessary worries and repeated callings are avoided.

In another embodiment of the present disclosure, optionally, the method further includes: receiving a telephone number of a terminal and first battery level information sent by the terminal when the battery level is lower than the first preset value; and storing the telephone number of the terminal and the first battery level information in the battery level information database. The server may store the telephone number in association with the first battery level information so that the battery level information may be obtained promptly using the telephone number as a key value when searching the battery level information database.

In another embodiment of the present disclosure, optionally, the method further includes: receiving the telephone number of the terminal and second battery level information sent by the terminal if the battery level is higher than a second preset value; and updating battery level information associated with the telephone number of the terminal in the battery level information database from the first battery level information to the second battery level information.

In addition, the method may include: receiving a request from the terminal to generate a report about recent battery level changes; and sending a report to the terminal about the recent battery level changes in a preset time period. The preset time period may be a week, two weeks, a month, etc. With the report, the terminal user may analyze the battery usage and get more details about how often the battery is depleted during the preset time period. The report may include drawings or tables to illustrate the changes of battery levels from lower than the first preset value to higher than the second preset value, from higher than the second preset value to lower than the first preset value, elapsed time between each adjacent battery level changes, elapsed time between each pair of consecutive shut downs due to battery depletion, or other analytic information related to battery usages.

Figure 2:
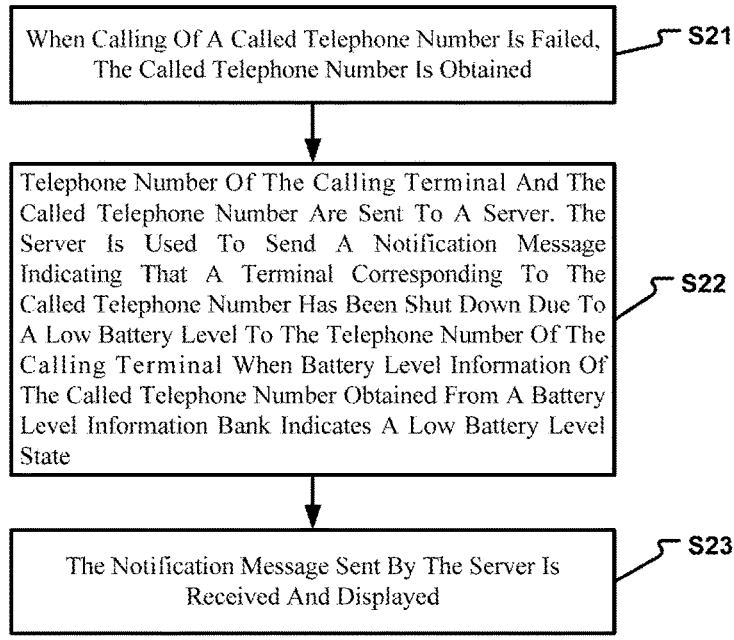
FIG. 2 is a flowchart showing a prompting method according to one or more exemplary embodiments.

FIG. 2 is a flowchart showing a prompting method according to one or more exemplary embodiments. As shown in FIG. 2, the prompting method may be applied in a terminal device (i.e., a calling terminal), and includes the following steps S21 to S23.

In step S21, when calling of a called telephone number is failed, the called telephone number is obtained.

In step S22, a telephone number of the calling terminal and the called telephone number are sent to a server. The server is used to send a notification message indicating that a terminal corresponding to the called telephone number has been shut down due to a low battery level to the telephone number of the calling terminal when battery level information of the called telephone number obtained from a battery level information database indicates a low battery level state.

In step S23, the notification message sent by the server is received and displayed. The terminal device may include any electronic device having a chip and a display accessible to the chip. The terminal device may include: an electric car, a car integrated with a cellular communication capabilities, a smartphone, etc.

In the method provided by the present disclosure, when calling of the called telephone number is failed, a terminal device sends the called telephone number to a server. The server obtains stored battery level information associated with the called telephone number from a battery level information database. When the obtained battery level information indicates a low battery level state, it indicates that before calling a terminal corresponding to the called telephone number, the battery level of the terminal corresponding to the called telephone number is already lower than a first preset value, and thus calling of the called telephone number by the terminal device is failed. The reason might be that the terminal corresponding to the called telephone number has been shut down due to a low battery level. The terminal device receives a notification message sent by the server indicating that the terminal corresponding to the called telephone number has been shut down due to the low battery level, which can prompt a calling user. Therefore, when a mobile phone of a called party cannot be connected, the calling user can be timely informed that the mobile phone of the called party has been shut down due to depleted battery level, and thus unnecessary worries and repeated callings are avoided.

Figure 3:
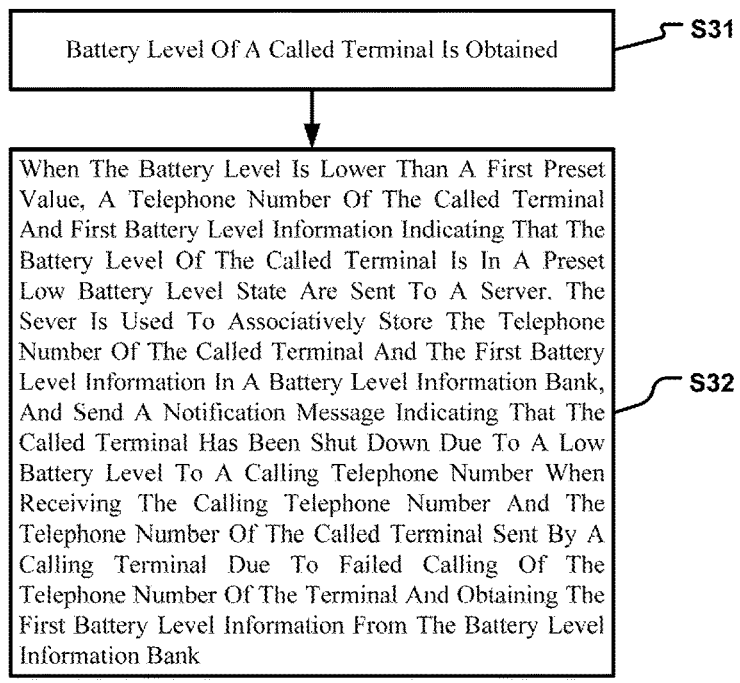
FIG. 3 is a flowchart showing a prompting method according to one or more exemplary embodiments.

FIG. 3 is a flowchart showing a prompting method according to one or more exemplary embodiments. As shown in FIG. 3, the prompting method may be implemented at least partially in a terminal device (i.e., a called terminal), and includes the following steps S31 to S32.

In step S31, a battery level of the called terminal is obtained. The battery level may indicate a quantitative measure of the battery status of the called terminal or a qualitative measure of the current battery status.

In step S32, when the battery level is lower than a first preset value, a telephone number of the called terminal and first battery level information indicating that the battery level of the called terminal is in a preset low battery level state are sent to a server. The sever may associatively store the telephone number of the called terminal and the first battery level information in a battery level information database, and send a notification message indicating that the called terminal has been shut down due to a low battery level to a calling telephone number when receiving the calling telephone number and the telephone number of the called terminal sent by a calling terminal due to failed calling of the telephone number of the called terminal and obtaining the first battery level information from the battery level information database.

In the method provided by the present disclosure, when the battery level of a terminal device is lower than a first preset value, the terminal device sends a telephone number of the terminal device, which may be a called terminal, and first battery level information indicating that the battery level of the terminal device is in a preset low battery level state to a server. The server associatively stores the telephone number of the terminal device and the first battery level information, so that the server may determine the battery level associated with the telephone number is already lower when receiving the telephone number of the terminal device sent by the calling terminal. Therefore, a notification message indicating that the called terminal corresponding to the telephone number has been shut down due to a low battery level is sent to the calling telephone number. This can promptly notify a calling user. Therefore, when a mobile phone of a called party cannot be connected, the calling user can be timely informed that the mobile phone of the called party has been shut down due to depleted battery level, and thus unnecessary worries and repeated callings are avoided.

In another embodiment of the present disclosure, optionally, the method further includes: when the battery level is higher than a second preset value, sending the telephone number of the called terminal and second battery level information indicating that the battery level of the terminal is not in the low battery level state to the server, where the sever may update battery level information of the telephone number of the called terminal in the battery level information database from the first battery level information to the second battery level information.

When the battery level of a terminal is higher than a second preset value, second battery level information can be sent to a server, so that the server updates the stored battery level information associated with the telephone number of the terminal.

All of the above optional technical solutions may be combined to form alternative embodiments of the present disclosure, and thus repeated descriptions are omitted here.

Figure 4:
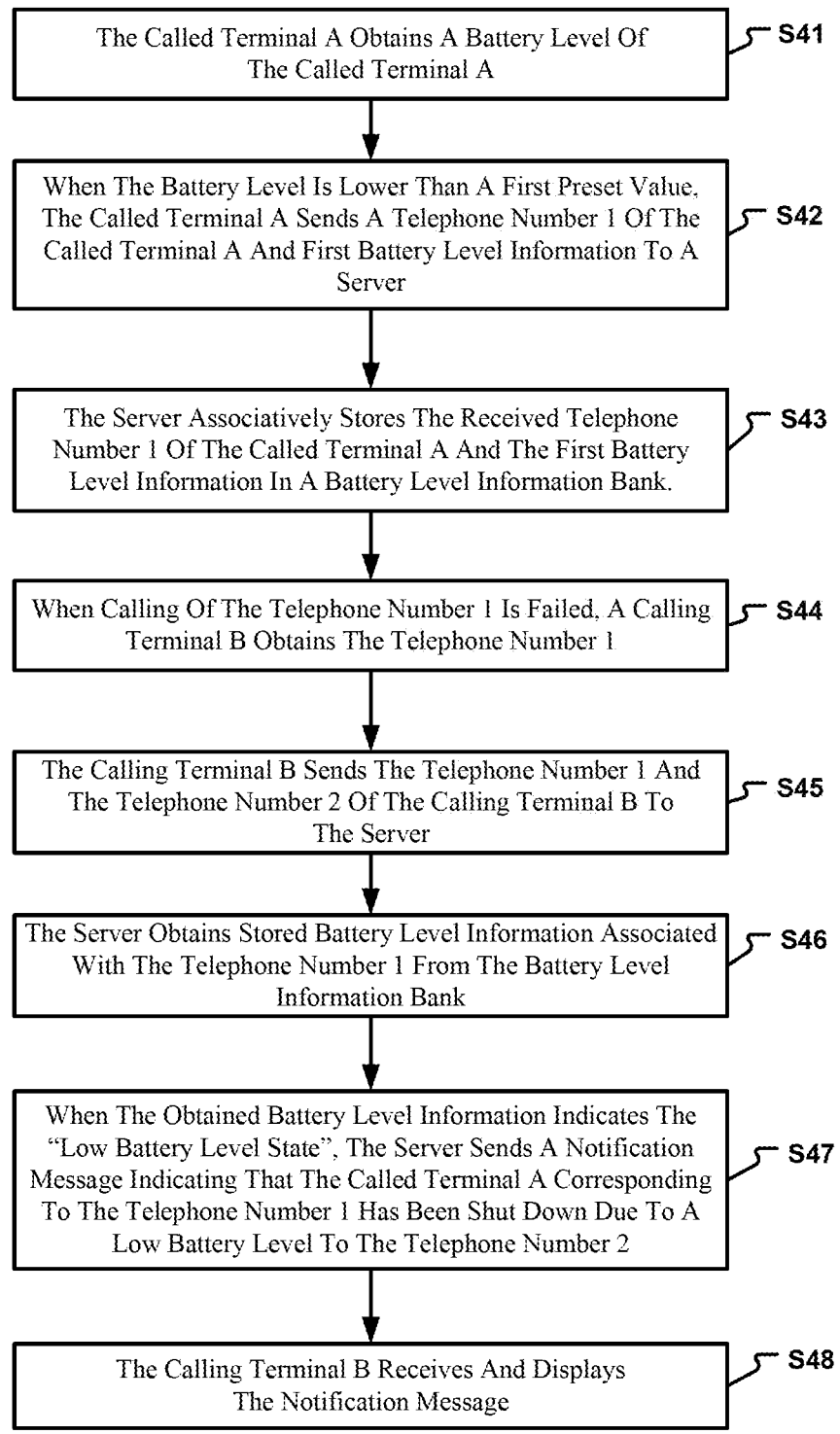
FIG. 4 is a flowchart showing a prompting method according to one or more exemplary embodiments.

FIG. 4 is a flowchart showing a prompting method according to one or more exemplary embodiments, in which interactive parties involved are a called terminal A, a calling terminal B and a server. As shown in FIG. 4, the method may include the following steps.

In step S41, the called terminal A obtains a battery level of the called terminal A.

In step S42, when the battery level is lower than a first preset value, the called terminal A sends a telephone number 1 of the called terminal A and first battery level information to a server.

For example, the first preset value is 3%. If the obtained battery level of the called terminal A is 2%, i.e., lower than the first preset value of 3%, the telephone number of the called terminal A and the first battery level information are sent to the server. The first battery level information is used to indicate that the battery level of the called terminal A is in a preset low battery level state. The first battery level information is, for example, "low battery level state", and the first battery level information may also be a specific value such as "2%".

In step S43, the server associatively stores the received telephone number 1 of the called terminal A and the first battery level information in a battery level information database.

The battery level information database stores battery level information uploaded by respective terminals corresponding to respective telephone numbers when the battery level is lower than the first preset value. As shown in a Table 1, the battery level information database may include a plurality of telephone numbers and respective battery level information. The battery level information database may include additional columns, which may identify telephone numbers with granted access to obtain the battery level information.

TABLE 1

| Telephone number | Battery level information |
| --- | --- |
| Telephone number 1 | Low battery level state |
| Telephone number 2 | Low battery level state |
| Telephone number 3 | Low battery level state |

In step S44, when calling of the telephone number 1 is failed, the calling terminal B obtains the telephone number 1.

The calling terminal B is configured with the cases of monitoring that calling of the telephone number by the terminal is failed. For example, when calling the telephone number 1, and the calling terminal B receives a busy signal, or receives voice notification such as "the number you dialed is powered off", or "the number you dialed cannot be connected", it is determined that calling of the telephone number 1 by the calling terminal B is failed.

In step S45, the calling terminal B sends the telephone number 1 and the telephone number 2 of the calling terminal B to the server.

In step S46, the server obtains stored battery level information associated with the telephone number 1 from the battery level information database.

In step S47, when the obtained battery level information indicates the "low battery level state," the server sends a notification message indicating that the called terminal A corresponding to the telephone number 1 has been shut down due to a low battery level to the telephone number 2.

In another embodiment of the present disclosure, when battery level information stored in the battery level information database is a specific value of the battery level, the battery level of lower than 3% may be set as the preset low battery level state.

In step S48, the calling terminal B receives and displays the notification message.

In the method provided by the present disclosure, when the battery level is lower than a first preset value, the terminal uploads battery level information to a server. The server receives the called telephone number sent by a calling terminal, and obtains stored battery level information associated with the called telephone number. If the obtained battery level information indicates a low battery level state, it indicates that before calling a terminal corresponding to the called telephone number, the battery level of the terminal corresponding to the called telephone number is already lower than a first preset value, and thus calling of the called telephone number by the calling terminal is failed. The reason might be that the terminal corresponding to the called telephone number has been shut down due to a low battery level. The server sends a notification message indicating that the terminal corresponding to the called telephone number has been shut down due to a low battery level to the calling telephone number, which can prompt a calling user. Therefore, when a mobile phone of a called party cannot be connected, the calling user can be timely informed that the mobile phone of the called party has been shut down due to depleted battery level, and thus unnecessary worries and repeated callings are avoided.

Embodiments of the devices of the present disclosure will be described below. The devices can be used to implement the method of the present disclosure.

Figure 5:
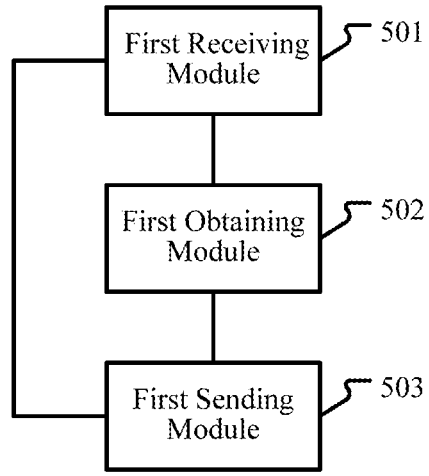
FIG. 5 is a block diagram showing a prompting apparatus according to one or more exemplary embodiments.

FIG. 5 is a block diagram showing a prompting apparatus according to one or more exemplary embodiments. The apparatus may be implemented as a part or whole of an electronic device by a software, a hardware, or a combination thereof. The apparatus may be applied in a server. As shown in FIG. 5, the apparatus includes a first receiving module 501, a first obtaining module 502, and a first sending module 503.

The first receiving module 501 is configured to receive a calling telephone number and a called telephone number sent by a calling terminal when calling of the called telephone number is failed.

The first obtaining module 502 is configured to obtain battery level information associated with the called telephone number received by the first receiving module 501 from a battery level information database, battery level information uploaded by a terminal corresponding to a telephone number if a battery level is lower than a first preset value being stored in the battery level information database.

The first sending module 503 is configured to, if the battery level information obtained by the first obtaining module 502 indicates a preset low battery level state, send a notification message indicating that a terminal corresponding to the called telephone number has been shut down due to a low battery level to the calling telephone number received by the first receiving module 501.

Figure 6:
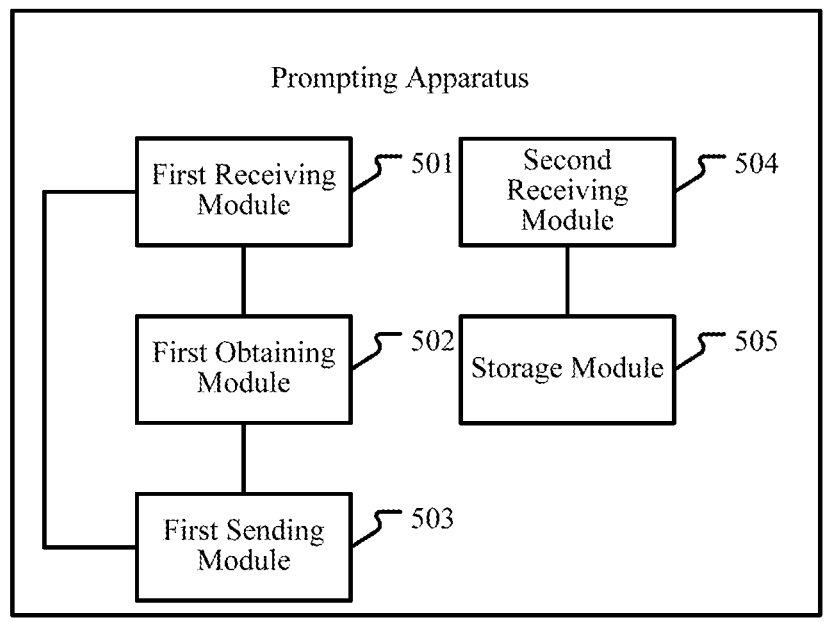
FIG. 6 is a block diagram showing a prompting apparatus according to one or more exemplary embodiments.

As shown in FIG. 6, the apparatus further includes a second receiving module 504 and a storage module 505. The second receiving module 504 is configured to receive a telephone number of a terminal and first battery level information sent by the terminal if a battery level is lower than a first preset value.

The storage module 505 is configured to associatively store the telephone number of the terminal and the first battery level information received by the second receiving module in the battery level information database.

Figure 7:
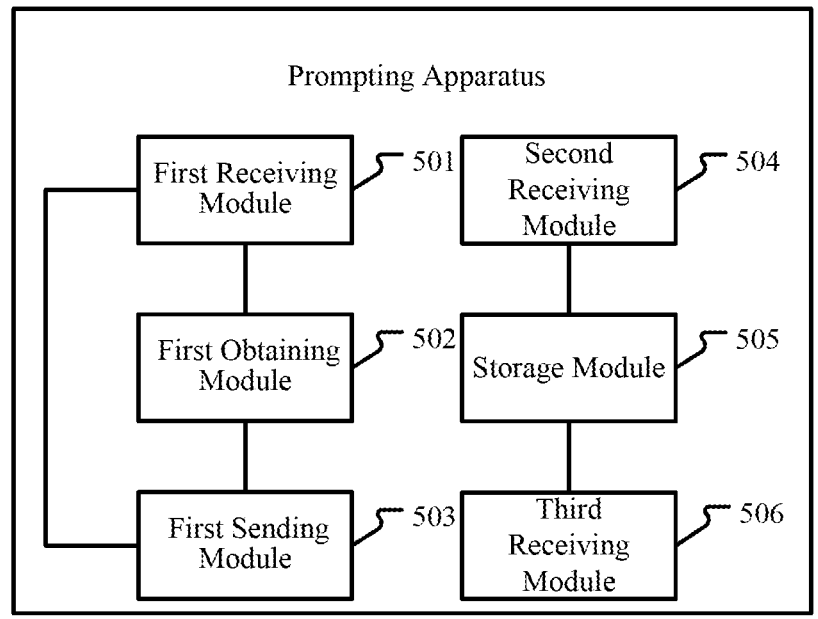
FIG. 7 is a block diagram showing a prompting apparatus according to one or more exemplary embodiments.

As shown in FIG. 7, the apparatus may further include a third receiving module 506. The third receiving module 506 is configured to receive the telephone number of the terminal and second battery level information sent by the terminal if the battery level is higher than a second preset value. The storage module 505 is further configured to update battery level information associated with the telephone number of the terminal in the battery level information database from the first battery level information to the second battery level information.

Figure 8:
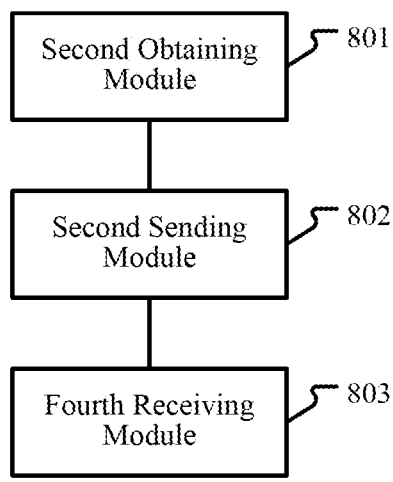
FIG. 8 is a block diagram showing a prompting apparatus according to one or more exemplary embodiments.

FIG. 8 is a block diagram showing a prompting apparatus according to one or more exemplary embodiments. The apparatus may be implemented as a part or whole of an electronic device by a software, a hardware or a combination thereof. The apparatus may be applied in a terminal device (i.e., a calling terminal). As shown in FIG. 8, the apparatus includes a second obtaining module 801, a second sending module 802, and a fourth receiving module 803.

The second obtaining module 801 is configured to obtain a called telephone number when calling of the called telephone number is failed.

The second sending module 802 is configured to send a telephone number of the calling terminal and the called telephone number obtained by the second obtaining module to a server, the server being used to send a notification message indicating that a terminal corresponding to the called telephone number has been shut down due to a low battery level to the telephone number of the calling terminal when battery level information of the called telephone number obtained from a battery level information database indicates a low battery level state.

The fourth receiving module 803 is configured to receive and display the notification message sent by the server.

Figure 9:
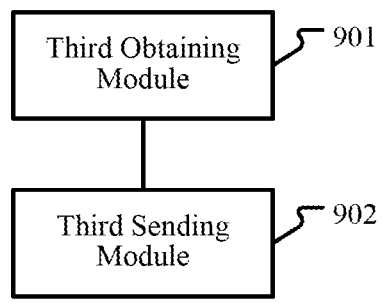
FIG. 9 is a block diagram showing a prompting apparatus according to one or more exemplary embodiments.

FIG. 9 is a block diagram showing a prompting apparatus according to one or more exemplary embodiments. The apparatus can be implemented as a part or whole of an electronic device by a software, a hardware or a combination thereof. The apparatus may be applied in a terminal device (i.e., a called terminal). As shown in FIG. 9, the apparatus includes a third obtaining module 901 and a third sending module 902.

The third obtaining module 901 is configured to obtain a battery level of the called terminal. When the battery level obtained by the third obtaining module 901 is lower than a first preset value, the third sending module 902 is configured to send a telephone number of the called terminal and first battery level information indicating that the battery level of the called terminal is in a preset low battery level state to a server. Here, the sever may associatively store the telephone number of the called terminal and the first battery level information in a battery level information database, and send a notification message indicating that the called terminal has been shut down due to a low battery level to a calling telephone number when receiving the calling telephone number and the telephone number of the called terminal sent by a calling terminal due to failed calling of the telephone number of the called terminal and obtaining the first battery level information from the battery level information database.

Figure 10:
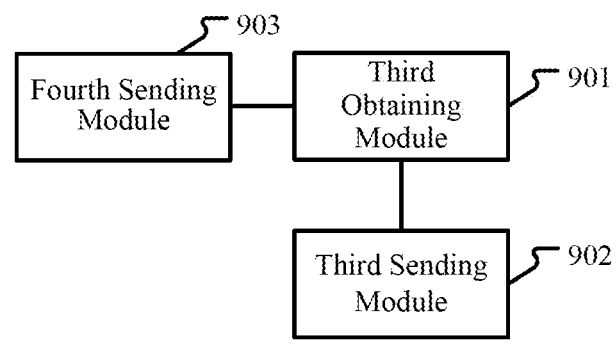
FIG. 10 is a block diagram showing a prompting apparatus according to one or more exemplary embodiments.

As shown in FIG. 10, the apparatus may further include a fourth sending module 903. The fourth sending module 903 is configured to, when the battery level obtained by the third obtaining module is higher than a second preset value, send the telephone number of the called terminal and second battery level information indicating that the battery level of the called terminal is not in the low battery level state to the server, the sever being used to update battery level information of the telephone number of the called terminal in the battery level information database from the first battery level information to the second battery level information.

The present disclosure further provides a prompting apparatus, applied in a server and including: a processor; and a memory for storing instructions executable by the processor. The processor is configured to: receive a calling telephone number and a called telephone number sent by a calling terminal when calling of the called telephone number is failed; obtain stored battery level information associated with the called telephone number from a battery level information database, battery level information uploaded by a terminal corresponding to a telephone number if a battery level is lower than a first preset value being stored in the battery level information database. When the obtained battery level information indicates a preset low battery level state, the processor may send a notification message indicating that a terminal corresponding to the called telephone number has been shut down due to a low battery level to the calling telephone number.

The present disclosure further provides a prompting apparatus, applied in a calling terminal and including: a processor; and a memory for storing instructions executable by the processor. The processor is configured to: obtain a called telephone number when calling of a called telephone number is failed; send a telephone number of the calling terminal and the called telephone number to a server, the server being used to send a notification message indicating that a terminal corresponding to the called telephone number has been shut down due to a low battery level to the telephone number of the calling terminal when battery level information associated with the called telephone number obtained from a battery level information database indicates a low battery level state; and receive and display the notification message sent by the server.

The present disclosure further provides a prompting apparatus, applied in a called terminal and including: a processor; and a memory for storing instructions executable by the processor. The processor is configured to: obtain a battery level of the called terminal; and when the battery level is lower than a first preset value, send a telephone number of the called terminal and first battery level information indicating that the battery level of the called terminal is in a preset low battery level state to a server, the sever being used to associatively store the telephone number of the called terminal and the first battery level information in a battery level information database, and send a notification message indicating that the called terminal has been shut down due to a low battery level to a calling telephone number when receiving the calling telephone number and the telephone number of the called terminal sent by a calling terminal due to failed calling of the telephone number of the called terminal and obtaining the first battery level information from the battery level information database.

With respect to the apparatuses in the above embodiments, the specific manners for performing operations for individual modules therein have been described in detail in the embodiments regarding the methods, which will not be elaborated herein.

Figure 11:
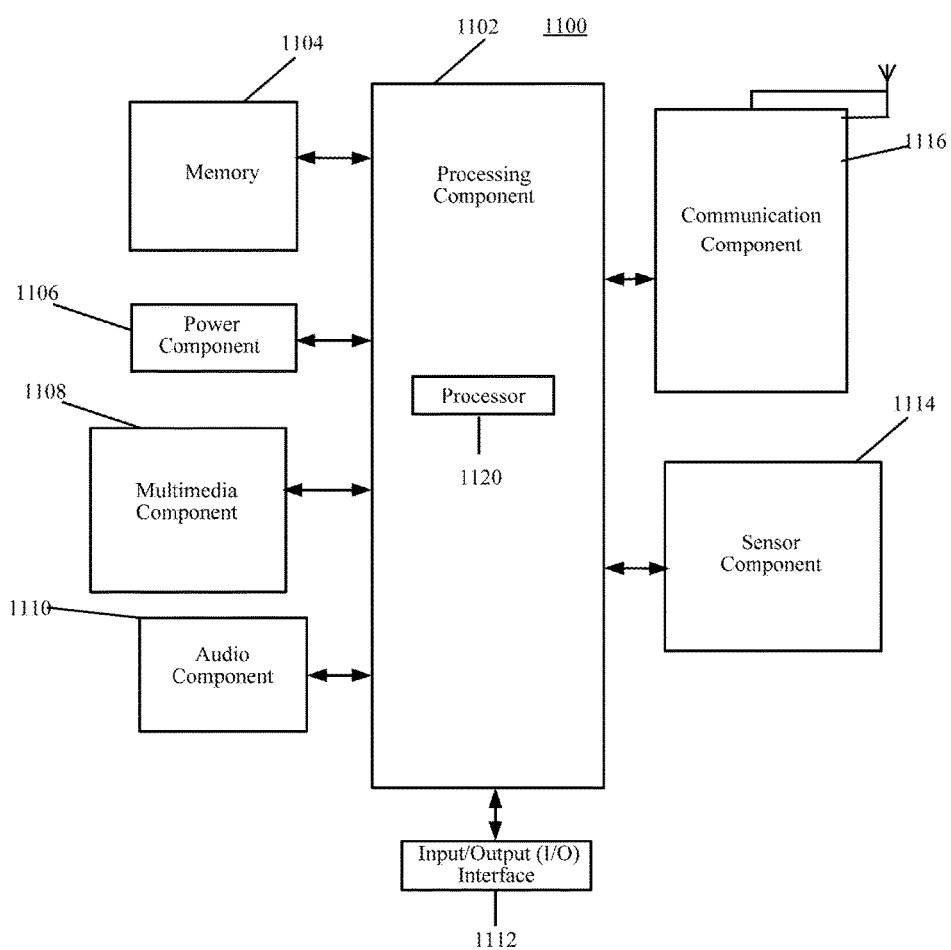
FIG. 11 is a block diagram of an apparatus for prompting according to one or more exemplary embodiments.

FIG. 11 is a block diagram of an apparatus 1100 for prompting according to one or more exemplary embodiments. For example, the apparatus 1100 may be a mobile phone, a computer, a digital broadcast terminal, a messaging device, a gaming console, a tablet, a medical device, exercise equipment, a personal digital assistant, an unmanned aerial vehicle, and the like.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the apparatus 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the apparatus 1100 is in an operation mode, such as a calling mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100, relative positioning of components, e.g., the display and the keypad, of the apparatus 1100, a change in position of the apparatus 1100 or a component of the apparatus 1100, a presence or absence of user contact with the apparatus 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the apparatus 1100 and other devices. The apparatus 1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1100 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus 1100 may use the circuitries in combination with the other hardware or software components for executing the method above. Each module, sub-module, unit, or sub-unit disclosed above may be implemented at least partially using the one or more circuitries.

In exemplary embodiments, there is also provided a non-transitory computer-readable storage medium including instructions, such as included in the memory 1104, executable by the processor 1120 in the apparatus 1100, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of a terminal device (i.e., a calling terminal), causes the terminal device to perform acts includes: obtaining a called telephone number when calling of the called telephone number is failed; sending a telephone number of the calling terminal and the called telephone number to a server, the server being used to send a notification message indicating that a terminal corresponding to the called telephone number has been shut down due to a low battery level to the telephone number of the calling terminal when battery level information of the called telephone number obtained from a battery level information database indicates a low battery level state; and receiving and displaying the notification message sent by the server.

Figure 12:
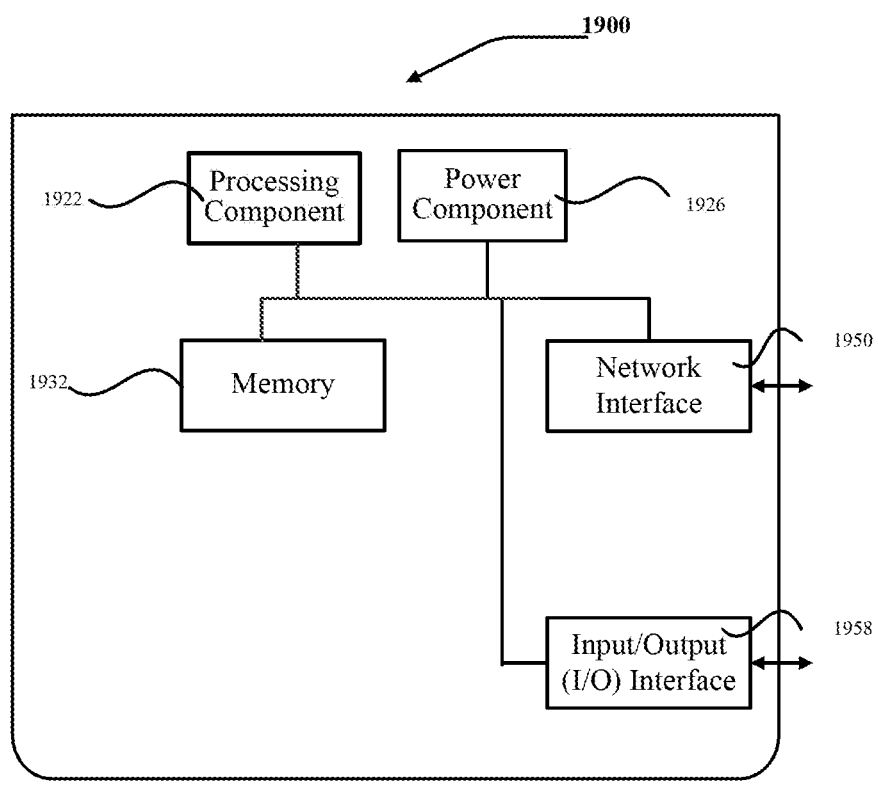
FIG. 12 is a block diagram a server for prompting according to one or more exemplary embodiments.

FIG. 12 is a block diagram for a prompting device 1900 according to one or more exemplary embodiments. For example, the device 1900 may be provided as a network side device.

Referring to FIG. 12, the device 1900 includes a processing component 1922 that further includes one or more processors, and memory resources represented by a memory 1932 for storing instructions executable by the processing component 1922, such as application programs. The application programs stored in the memory 1932 may include one or more modules each corresponding to a set of instructions. Further, the processing component 1922 is configured to execute the instructions to perform the solutions for locating a wearable device at the server side.

The device 1900 may also include a power component 1926 configured to perform power management of the device 1900, wired or wireless network interface(s) 1950 configured to connect the device 1900 to a network, and an input/output (I/O) interface 1958. The device 1900 may operate based on an operating system stored in the memory 1932, such as Windows Server™, Mac OS X™, Unix™, Linux™, FreeBSD™, or the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for prompting a message, comprising:
receiving, by a server, a calling telephone number and a called telephone number from a calling terminal when calling of the called telephone number is failed and the calling terminal receives a notification message indicating that a called terminal corresponding to the called telephone number is powered off;
obtaining, by the server, stored battery level information associated with the called telephone number from a battery level information database, wherein the battery level information database stores battery level information uploaded by a terminal corresponding to a telephone number when a battery level of the terminal is lower than a first preset value; and
when the obtained battery level information indicates a preset low battery level state and when determining that the calling telephone number has access to the battery level information in the battery level information database, sending, by the server, a notification message to the calling telephone number, the notification message indicating that the called terminal corresponding to the called telephone number has been shut down due to a low battery level.

2. The method according to claim 1, further comprising:
receiving the telephone number of the terminal and first battery level information sent by the terminal when the battery level is lower than the first preset value; and
storing the telephone number of the terminal and the first battery level information in the battery level information database.

3. The method according to claim 2, further comprising:
receiving the telephone number of the terminal and second battery level information sent by the terminal if the battery level is higher than a second preset value; and
updating battery level information associated with the telephone number of the terminal in the battery level information database from the first battery level information to the second battery level information.

4. The method according to claim 3, further comprising:
receiving a request from the terminal to generate a report about recent battery level changes; and
sending a report to the terminal about the recent battery level changes in a preset time period.

5. An apparatus, comprising:
a processor; and
a memory for storing instructions executable by the processor;
wherein the processor is configured to:
receive a calling telephone number and a called telephone number from a calling terminal when calling of the called telephone number is failed and the calling terminal receives a notification message indicating that a called terminal corresponding to the called telephone number is powered off;
obtain stored battery level information associated with the called telephone number from a battery level information database, wherein the battery level information database stores battery level information uploaded by a terminal corresponding to a telephone number when a battery level of the terminal is lower than a first preset value; and
when the obtained battery level information indicates a preset low battery level state and when determining that the calling telephone number has access to the battery level information in the battery level information database, send a notification message to the calling telephone number, the notification message indicating that a called terminal corresponding to the called telephone number has been shut down due to a low battery level.

6. The apparatus according to claim 5, wherein the processor is configured to:
receive the telephone number of the terminal and first battery level information sent by the terminal when the battery level is lower than the first preset value; and
store the telephone number of the terminal and the first battery level information in the battery level information database.

7. The apparatus according to claim 6, wherein the processor is configured to:
receive the telephone number of the terminal and second battery level information sent by the terminal when the battery level is higher than a second preset value; and
update battery level information associated with the telephone number of the terminal in the battery level information database from the first battery level information to the second battery level information.

8. The apparatus according to claim 7, wherein the processor is configured to:
receive a request from the terminal to generate a report about recent battery level changes; and
send a report to the terminal about the recent battery level changes in a preset time period.

9. A non-transitory computer-readable storage medium comprising instructions that, when executed by a processor of a server device, cause the server device to perform acts comprising:
receiving a calling telephone number and a called telephone number from a calling terminal when calling of the called telephone number is failed and the calling terminal receives a notification message indicating that a called terminal corresponding to the called telephone number is powered off;
obtaining stored battery level information associated with the called telephone number from a battery level information database, wherein the battery level information database stores battery level information uploaded by a terminal corresponding to a telephone number when a battery level of the terminal is lower than a first preset value; and
when the obtained battery level information indicates a preset low battery level state and when determining that the calling telephone number has access to the battery level information in the battery level information database, sending a notification message to the calling telephone number, the notification message indicating that a called terminal corresponding to the called telephone number has been shut down due to a low battery level.

10. The non-transitory computer-readable storage medium according to claim 9, wherein the acts further comprise:
receiving the telephone number of the terminal and first battery level information sent by the terminal when the battery level is lower than the first preset value; and
storing the telephone number of the terminal and the first battery level information in the battery level information database.

11. The non-transitory computer-readable storage medium according to claim 10, wherein the acts further comprise:
receiving the telephone number of the terminal and second battery level information sent by the terminal if the battery level is higher than a second preset value; and
updating battery level information associated with the telephone number of the terminal in the battery level information database from the first battery level information to the second battery level information.

12. The non-transitory computer-readable storage medium according to claim 11, wherein the acts further comprise:
receiving a request from the terminal to generate a report about recent battery level changes; and
sending a report to the terminal about the recent battery level changes in a preset time period.

\* \* \* \* \*